(12) United States Patent
Wang et al.

(10) Patent No.: US 10,063,180 B2
(45) Date of Patent: Aug. 28, 2018

(54) MULTIPLE INVERTER HYBRID DRIVE SYSTEM

(71) Applicant: Ford Global Technologies, LLC, Dearborn, MI (US)

(72) Inventors: Jiyao Wang, Canton, MI (US); Wei Xu, Canton, MI (US); Shuzhen Liu, Novi, MI (US); Zhichun Ma, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/420,802

(22) Filed: Jan. 31, 2017

(65) Prior Publication Data

US 2018/0219507 A1    Aug. 2, 2018

(51) Int. Cl.
| | |
|---|---|
| *H02P 27/04* | (2016.01) |
| *H02P 27/08* | (2006.01) |
| *H02P 6/14* | (2016.01) |
| *H02M 7/5387* | (2007.01) |
| *H02J 7/14* | (2006.01) |
| *B60L 15/02* | (2006.01) |
| *B60K 6/48* | (2007.10) |

(52) U.S. Cl.
CPC .............. *H02P 27/08* (2013.01); *B60L 15/02* (2013.01); *H02J 7/14* (2013.01); *H02M 7/53871* (2013.01); *H02P 6/14* (2013.01); *B60K 6/48* (2013.01); *B60L 2210/10* (2013.01); *B60Y 2200/92* (2013.01); *B60Y 2400/604* (2013.01); *Y10S 903/906* (2013.01)

(58) Field of Classification Search
CPC ...... H02P 1/00; H02P 3/00; H02P 5/00; H02P 6/00; H02P 21/00; H02P 27/04; H02P 27/06; H02P 41/00; H02P 1/46; H02P 3/18

USPC .... 318/400.01, 400.02, 400.14, 400.15, 700, 318/701, 779, 799, 800, 801, 599; 363/40, 44, 95, 120, 174, 175
See application file for complete search history.

(56) References Cited

U.S. PATENT DOCUMENTS

| | | | |
|---|---|---|---|
| 7,138,773 B2 | 11/2006 | Kumar | |
| 8,013,553 B2* | 9/2011 | Taniguchi | ............... H02P 25/22 318/400.27 |
| 8,390,163 B2* | 3/2013 | Saito | ..................... B60K 6/448 310/156.53 |

(Continued)

FOREIGN PATENT DOCUMENTS

WO    2012-066045 A2    5/2012

OTHER PUBLICATIONS

Archana Nanoty et al., Control of Designed Developed Six Phase Induction Motor, International Journal of Electromagnetics and Applications 2012, 2(5); pp. 77-84.

*Primary Examiner* — Antony M Paul
(74) *Attorney, Agent, or Firm* — David B. Kelley; Brooks Kushman P.C.

(57) ABSTRACT

A powertrain for a vehicle includes and electric machine and a plurality of inverters. The electric machine may include a stator defining a plurality of stator teeth separated by slots that are configured to accept windings. The plurality of inverters may each be configured to exclusively drive a current in some but not all of the windings within slots such that some of the plurality of stator teeth within a sector of the stator are configured to be energized by only one of the inverters.

8 Claims, 8 Drawing Sheets

(56) References Cited

U.S. PATENT DOCUMENTS

| | | |
|---|---|---|
| 8,928,264 B2 | 1/2015 | Taniguchi |
| 9,174,525 B2 | 11/2015 | Caron |
| 9,236,791 B2 | 1/2016 | Kumar et al. |
| 9,300,176 B2 * | 3/2016 | Saito ................ H02K 1/24 |
| 9,564,779 B2 * | 2/2017 | Nakano ............ H02K 21/16 |
| 9,705,443 B2 * | 7/2017 | Kikuchi ............ H02P 25/22 |
| 9,755,470 B2 * | 9/2017 | Hirotani ........... H02K 3/28 |
| 2007/0070667 A1 | 3/2007 | Stancu et al. |
| 2009/0033253 A1 | 2/2009 | Nagashima et al. |
| 2009/0033274 A1 | 2/2009 | Perisic et al. |
| 2009/0134828 A1 | 5/2009 | Chakrabarti et al. |
| 2012/0206076 A1 | 8/2012 | Tanaka |
| 2013/0264981 A1 | 10/2013 | Taniguchi |
| 2013/0264984 A1 | 10/2013 | Tamura et al. |
| 2014/0145547 A1 * | 5/2014 | Nakano ............ H02K 21/16 310/216.069 |
| 2016/0056684 A1 * | 2/2016 | Nemoto ............ H02K 21/14 310/51 |
| 2016/0172939 A1 * | 6/2016 | Owen ................ H02K 9/19 310/54 |
| 2017/0093242 A1 * | 3/2017 | Hirotani ........... H02K 3/28 |
| 2017/0111003 A1 * | 4/2017 | Kikuchi ............ H02P 25/22 |

* cited by examiner

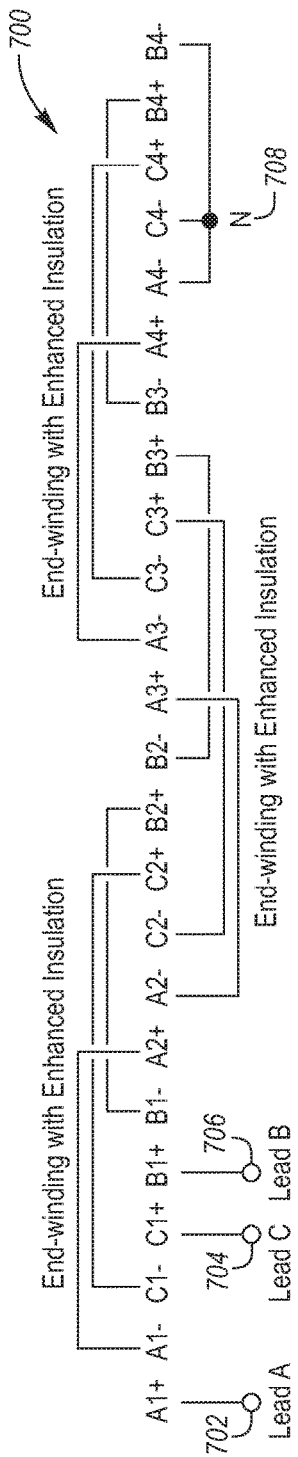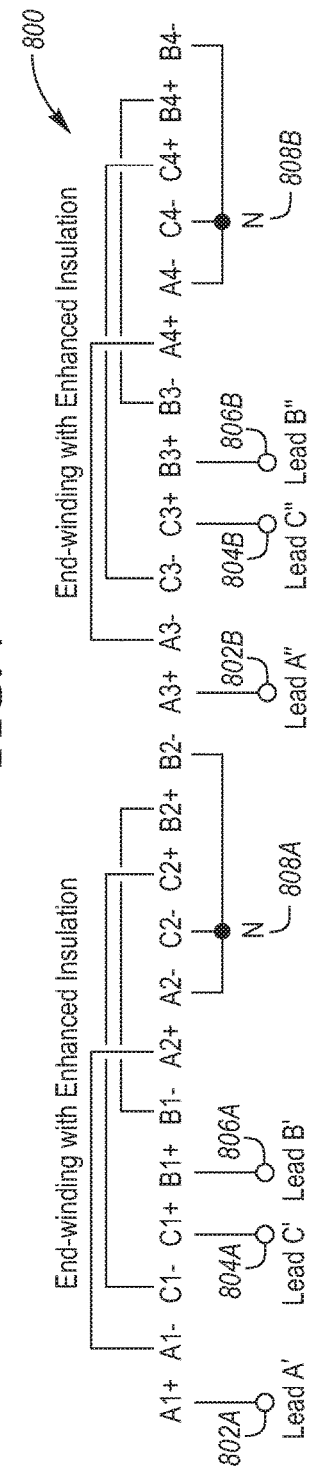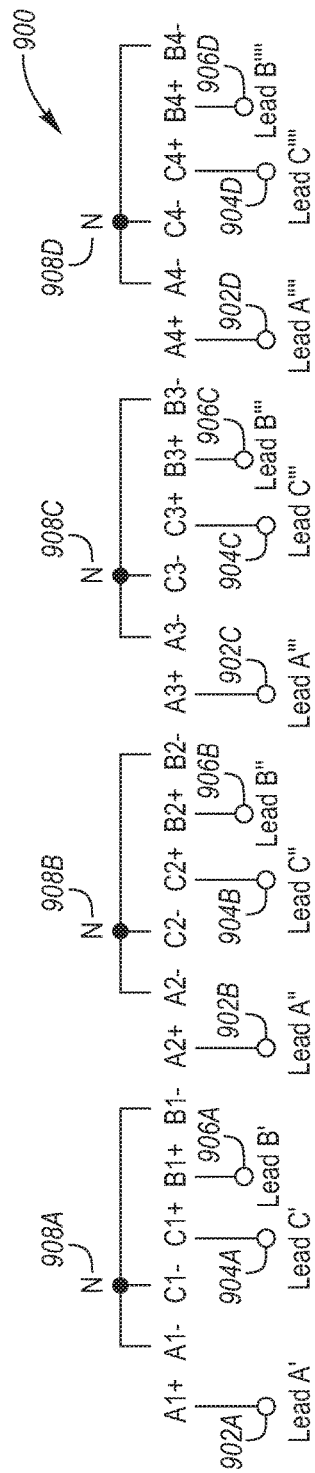

MULTIPLE INVERTER HYBRID DRIVE SYSTEM

TECHNICAL FIELD

This application is generally related to a multiple inverter system used to drive an electric machine of an electric vehicle.

BACKGROUND

Electrified vehicles including hybrid-electric vehicles (HEVs) and battery electric vehicles (BEVs) rely on a traction battery to provide power to a traction motor for propulsion and a power inverter therebetween to convert direct current (DC) power to alternating current (AC) power. The typical AC traction motor is a 3-phase motor that may be powered by 3 sinusoidal signals each driven with 120 degrees phase separation. The traction battery is configured to operate in a particular voltage range and provide a maximum current. The traction battery is alternatively referred to as a high-voltage battery wherein a terminal voltage of a typical traction battery is over 100 Volts DC. However, improved performance of electric machines may be achieved by operating in a different voltage range, typically at voltages greater than the traction battery terminal voltage. Likewise, the current requirements to drive a vehicular electric machine are commonly referred to as high current in which the current may exceed 600 Amps in operation.

Also, many electrified vehicles include a DC-DC converter, also referred to as a variable voltage converter (VVC), to convert the voltage of the traction battery to an operational voltage level of the electric machine. The electric machine, that may include a traction motor and a generator, may require high voltage and high current. Due to the voltage and current requirements, a battery module and a power electronics module are typically in continuous communication. The battery module provides critical information for the vehicle control algorithms including battery voltage, battery current, and battery state-of-charge (SOC).

SUMMARY

A powertrain for a vehicle includes and electric machine and a plurality of inverters. The electric machine may include a stator defining a plurality of stator teeth separated by slots that are configured to accept windings. The plurality of inverters may each be configured to exclusively drive a current in some but not all of the windings within slots such that some of the plurality of stator teeth within a sector of the stator are configured to be energized by only one of the inverters.

A powertrain for a vehicle includes an electric machine and a plurality of inverters. The electric machine may be configured to have a stator that includes a plurality of windings. The plurality of inverters each may be configured to exclusively drive a current in some but not all of the windings with stator slots such that any one of the windings is configured to be driven by only one of the inverters.

A method of controlling a powertrain includes inducing, by a first inverter, a first field in at least a first stator tooth located within a first sector of a stator, and inducing, by a second inverter, a second field in at least a second stator tooth located within a second sector of a stator that is distinct from the first sector.

BRIEF DESCRIPTION OF THE DRAWINGS

FIG. 7 is a wiring diagram of a typical electric motor connection for a 3-lead power inverter.

FIG. 8 is a wiring diagram of an electric motor connection for dual 3-lead power inverters.

FIG. 9 is a wiring diagram of an electric motor connection for four 3-lead power inverters.

DETAILED DESCRIPTION

Figure 1:
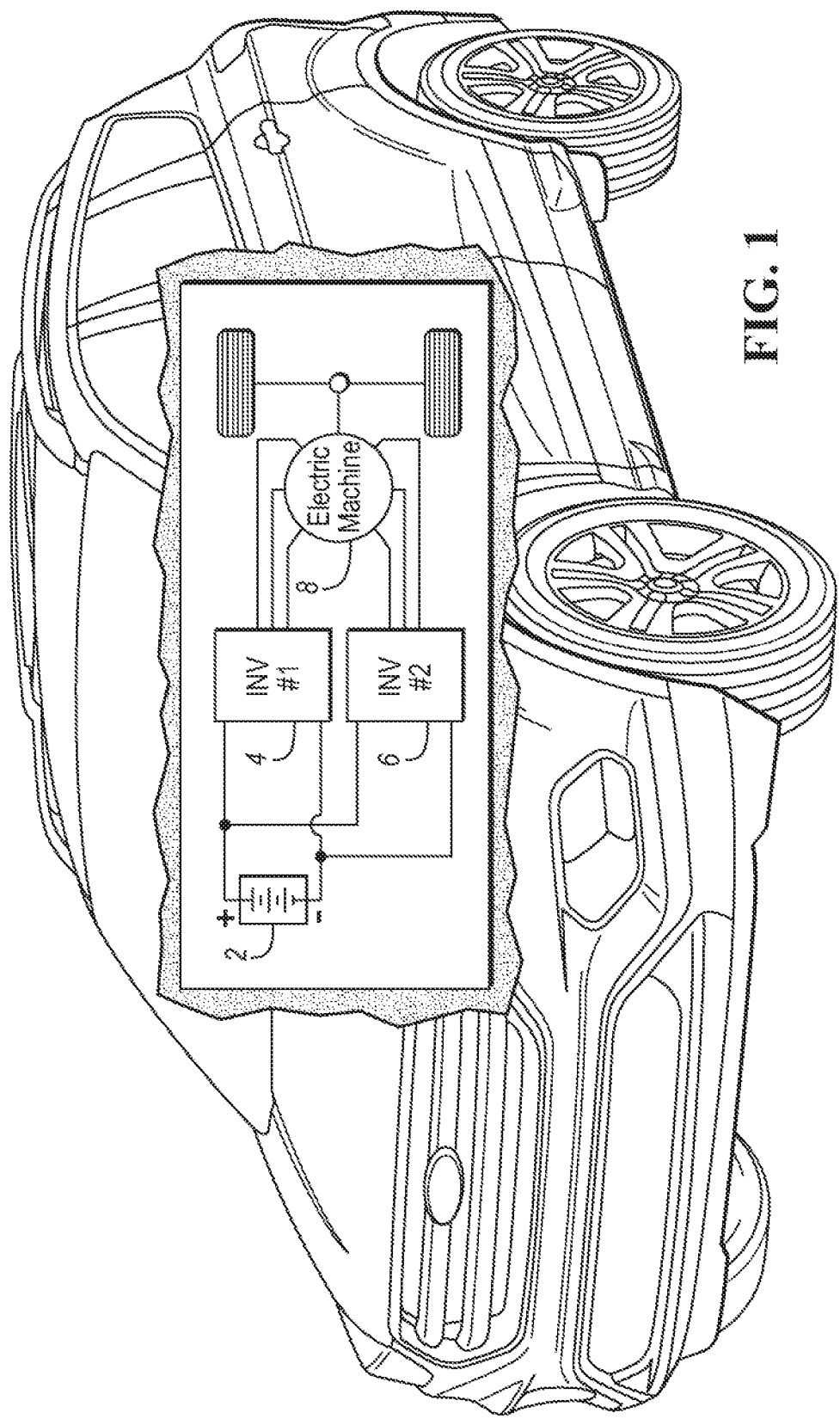
FIG. 1 is a diagram of a 6-lead electric machine powered by dual inverters and a traction battery.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A battery voltage of an electric vehicle may typically be different from the inverter DC bus voltage and therefore may require a DC-DC converter also referred to as a Variable Voltage Converter (VVC). For example, consider a battery pack that has a voltage of 200V and an electric machine that requires 120 kW of power to provide propulsion. An inverter DC bus may be configured to provide 400V at 300A or 200V at 600A to produce the required 120 kW traction motor power. Typically a traction motor may be fairly easily configured to accommodate different DC bus voltages to operate at. However, the choice of which DC bus voltage to select may be limited by the power electronics of the inverter. For example, if a 200V battery pack is directly connected to a 200V/600A DC bus, the inverter power switches have to operate at 200V/600A. This voltage/current combination may be cost prohibitive as the high current requirement at the lower voltage may not be economical as the inverter power switches having those specifications may be expensive. In comparison, inverter switches that operate at 400V/300A may be more cost-effective. To match the 200V battery voltage and desired 400V DC bus voltage, a DC/DC converter (e.g., VVC) may be used to boost the voltage from 200V to 400V. The use of the VVC will add extra power switches and inductors to the HEV drive system, thereby increasing size and cost. In addition, a VVC is typically connected as a cascaded-connection in the power circuit and hence power loss is generated twice during both battery charging and discharging cycles. This induces extra power loss and reduces vehicle fuel economy.

It is desirable to eliminate the DC/DC converter (e.g., VVC) in a HEV drive system, however a practical and economic way to provide the power requirement without having the cost of high current components (e.g., 200V/600A components for a 120 kW inverter).

Here a parallel inverter structure is used to divide the battery power to sections of an electric machine. The power flows in windings around stator teeth to induce a field within the stator teeth. This powertrain configuration is such that each inverter is used to focus a field in stator teeth that reside exclusively in a single section of the electric machine. For example, a dual inverter system bifurcates the power to a first and second inverter. The first inverter only supplies power to windings around stator teeth in a first section of the electric machine, while the second inverter only supplies power to windings around stator teeth in a second section of the electric machine. Here, the first section of the electric machine may be a first half of the electric machine, and the second section of the electric machine may be a second half of the electric machine. The sections of the electric machine are defined by a plane that is coincident with an axis of rotation of the electric machine.

FIG. 1 depicts a hybrid electric vehicle illustrating internal electric powertrain components. Here, a traction battery 2 is coupled with and controlled by a BECM. The BECM is typically in communication with a VVC (not shown), power inverters 4, power inverter 4, 6, a powertrain control module (PCM), and other vehicular modules via a data bus. The data bus may be a Car Area Network (CAN) bus, a Flexray bus, an Ethernet Bus, or other common bus system. Also, the battery 2, is coupled with the VVC, inverters 4,6, and electric machine 8, and configured to provide propulsive force to the vehicle. Generally, electric modules such as the VVC, inverters 4, 6, and PCM maintain communication with the BECM, via sending and receiving messages over the communication bus. The sending and receiving of messages occur at a regular interval. The regular interval may be periodic, semi-periodic, or within a specific timeframe; For example, a module may be configured to operate with a 2 millisecond control loop, and the BECM may be configured to transmit battery characteristics such as a state of charge (SOC) of the battery 2, a temperature of the battery 2, a voltage of the battery 2, a current flowing from the battery 2, a number of cycles that battery 2 has had, an age of the battery 2, and other characteristics. Typically, in response to the BECM transmitting a battery characteristic on the communication bus, other modules respond to the message by transmitting operational characteristics of their respective module. For example, the VVC may transmit an input voltage, an output voltage, an input current, an output current, an operation frequency, and other characteristic. In the event of a loss of communication, the BECM may or may not open main contactors depending on vehicle conditions. Opening battery main contactors would disconnect the battery 2 from the VVC, inverters 4, 6, and electric machine 8, thereby allowing the vehicle to operate in a mode in which the vehicle is propelled by the engine that is controlled by the PCM. Also, the VVC may shut down by opening internal switches including a high side pass switch and a low side charge switch, thereby disconnecting the battery voltage bus from the high-voltage DC bus used to drive the inverters 4, 6. In general, communication messages may be on a synchronous or asynchronous bus and the loss of communication may include a total loss of data on the communication bus, a partial loss of data on the communication bus, or errored data on the communication bus. For example, with a synchronous bus (e.g., Flexray, Ethernet Time-Sensitive Networking 'Ethernet TSN'), the message may be assigned a specific timeslot and a loss of communication may be an empty frame during the timeslot.

Figure 2:
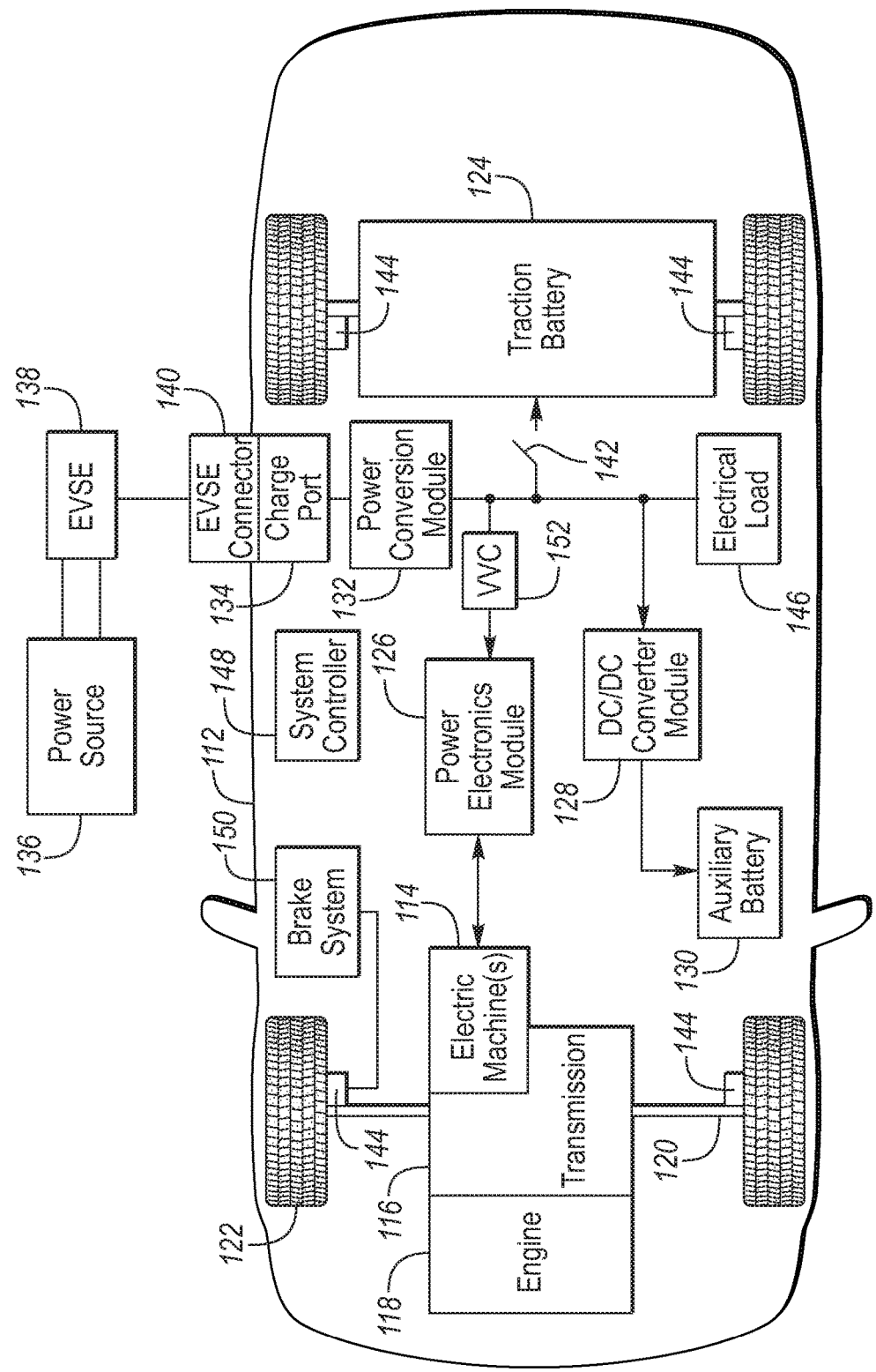
FIG. 2 is a diagram of a hybrid vehicle illustrating typical drivetrain and energy storage components including a variable voltage converter and power electronics module.

FIG. 2 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high-voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high-voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Often the VVC 152 is configured as a boost converter. The VVC 152 may include input terminals that may be coupled to terminals of the traction battery 124 through the contactors 142. The VVC 152 may include output terminals coupled to terminals of the power electronics module 126. The VVC 152 may be operated to cause a voltage at the output terminals to be greater than a voltage at the input terminals. The vehicle 112 may include a VVC controller that monitors and controls electrical parameters (e.g., voltage and current) at various locations within the VVC 152. In some configurations, the VVC controller may be included as part of the VVC 152. The VVC controller may determine an output voltage reference, $V^*_{dc}$. The VVC controller may determine, based on the electrical parameters and the voltage reference, $V^*_{dc}$, a control signal sufficient to cause the VVC 152 to achieve the desired output voltage. In some configurations, the control signal may be implemented as a pulse-width modulated (PWM) signal in which a duty cycle of the PWM signal is varied. The control signal may be operated at a predetermined switching frequency. The VVC controller may command the VVC 152 to provide the desired output voltage using the control signal. The particular control signal at which the VVC 152 is operated may be directly related to the amount of voltage boost to be provided by the VVC 152.

With reference to FIG. 2, the VVC 152 may boost or "step up" the voltage potential of the electrical power provided by the traction battery 124. The traction battery 124 may provide high-voltage (HV) DC power. In some configurations, the traction battery 124 may provide a voltage between 150 and 400 Volts. The contactor 142 may be electrically coupled in series between the traction battery 124 and the VVC 152. When the contactor 142 is closed, the HV DC power may be transferred from the traction battery 124 to the VVC 152. An input capacitor 202 may be electrically coupled in parallel to the traction battery 124. The input capacitor 202 may stabilize the bus voltage and reduce any voltage and current ripple. The VVC 152 may receive the HV DC power and boost or "step up" the voltage potential of the input voltage according to the duty cycle. Often an output capacitor is electrically coupled between the output terminals of the VVC 152 and the input of the power electronics module 126 to stabilize the bus voltage and reduce voltage and current ripple at the output of the VVC 152.

Figure 3:
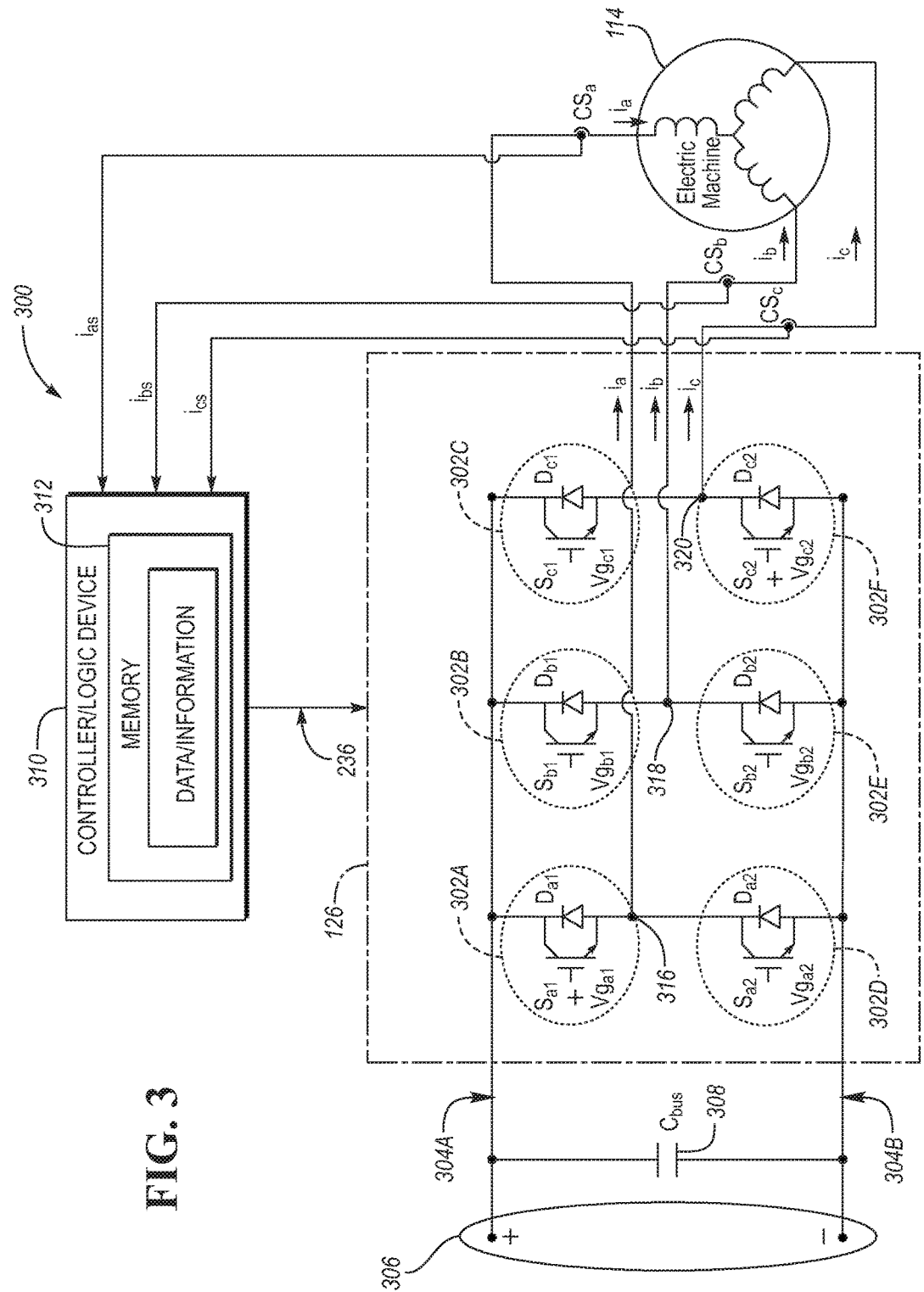
FIG. 3 is a schematic diagram of a power inverter of a power electronics module.

With reference to FIG. 3, a system 300 is provided for controlling a power electronics module (PEM) 126. The PEM 126 of FIG. 3 is shown to include a plurality of switches 302 (e.g., IGBTs) configured to collectively operate as an inverter with first, second, and third phase legs 316, 318, 320. While the inverter is shown as a three-phase converter, the inverter may include additional phase legs. For example, the inverter may be a four-phase converter, a five-phase converter, a six-phase converter, etc. In addition, the PEM 126 may include multiple converters with each inverter in the PEM 126 including three or more phase legs. For example, the system 300 may control two or more inverters in the PEM 126. The PEM 126 may further include a DC to DC converter having high power switches (e.g., IGBTs) to convert a power electronics module input voltage to a power electronics module output voltage via boost, buck or a combination thereof.

As shown in FIG. 3, the inverter may be a DC-to-AC converter. In operation, the DC-to-AC converter receives DC power from a DC power link 306 through a DC bus 304 and converts the DC power to AC power. The AC power is transmitted via the phase currents ia, ib, and is to drive an AC machine also referred to as an electric machine 114, such as a three-phase permanent-magnet synchronous motor (PMSM) as depicted in FIG. 3. In such an example, the DC power link 306 may include a DC storage battery to provide DC power to the DC bus 304. In another example, the inverter may operate as an AC-to-DC converter that converts AC power from the AC machine 114 (e.g., generator) to DC power, which the DC bus 304 can provide to the DC power link 306. Furthermore, the system 300 may control the PEM 126 in other power electronic topologies.

With continuing reference to FIG. 3, each of the phase legs 316, 318, 320 in the inverter includes power switches 302, which may be implemented by various types of controllable switches. In one embodiment, each power switch 302 may include a diode and a transistor, (e.g., an IGBT). The diodes of FIG. 3 are labeled $D_{a1}$, $D_{a2}$, $D_{b1}$, $D_{b2}$, $D_{c1}$, and $D_{c2}$ while the IGBTs of FIG. 3 are respectively labeled $S_{a1}$, $S_{a2}$, $S_{b1}$, $S_{b2}$, $S_{c1}$, and $S_{c2}$. The power switches $S_{a1}$, $S_{a2}$, $D_{a1}$, and $D_{a2}$ are part of phase leg A of the three-phase converter, which is labeled as the first phase leg A 316 in FIG. 3. Similarly, the power switches $S_{b1}$, $S_{b2}$, $D_{b1}$, and $D_{b2}$ are part of phase leg B 318 and the power switches $S_{c1}$, $S_{c2}$, $D_{c1}$, and $D_{c2}$ are part of phase leg C 320 of the three-phase converter. The inverter may include any number of the power switches 302 or circuit elements depending on the particular configuration of the inverter. The diodes ($D_{xx}$) are connected in parallel with the IGBTs ($S_{xx}$) however, as the polarities are reversed for proper operation, this configuration is often referred to as being connected anti-parallel. A diode in this anti-parallel configuration is also called a freewheeling diode.

As illustrated in FIG. 3, current sensors $CS_a$, $CS_b$, and $CS_c$ are provided to sense current flow in the respective phase legs 316, 318, 320. FIG. 3 shows the current sensors $CS_a$, $CS_b$, and $CS_c$ separate from the PEM 126. However, current sensors $CS_a$, $CS_b$, and $CS_c$ may be integrated as part of the PEM126 depending on its configuration. Current sensors $CS_a$, $CS_b$, and $CS_c$ of FIG. 3 are installed in series with each of phase legs A, B and C (i.e., phase legs 316, 318, 320 in FIG. 3) and provide the respective feedback signals $i_{as}$, $i_{bs}$, and $i_{cs}$ (also illustrated in FIG. 3) for the system 300. The feedback signals $i_{as}$, $i_{bs}$, and $i_{cs}$ may be raw current signals processed by logic device (LD) 310 or may be embedded or encoded with data or information about the current flow through the respective phase legs 316, 318, 320.

Also, the power switches 302 (e.g., IGBTs) may include current sensing capability. The current sensing capability may include being configured with a current mirror output, which may provide data/signals representative of $i_{as}$, $i_{bs}$, and $i_{cs}$. The data/signals may indicate a direction of current flow, a magnitude of current flow, or both the direction and magnitude of current flow through the respective phase legs A, B, and C.

Referring again to FIG. 3, the system 300 includes a logic device (LD) or controller 310. The controller or LD 310 can be implemented by various types or combinations of electronic devices and/or microprocessor-based computers or controllers. To implement a method of controlling the PEM 126, the controller 310 may execute a computer program or algorithm embedded or encoded with the method and stored in volatile and/or persistent memory 312. Alternatively, logic may be encoded in discrete logic, a microprocessor, a microcontroller, or a logic or gate array stored on one or more integrated circuit chips. As shown in the embodiment of FIG. 3, the controller 310 receives and processes the feedback signals $i_{as}$, $i_{bs}$, and $i_{cs}$ to control the phase currents $i_a$, $i_b$, and $i_c$ such that the phase currents $i_a$, $i_b$, and $i_c$ flow through the phase legs 316, 318, 320 and into the respective windings of the electric machine 114 according to various current or voltage patterns. For example, current patterns can include patterns of phase currents $i_a$, $i_b$, and $i_c$ flowing into and away from the DC-bus 304 or a DC-bus capacitor 308. The DC-bus capacitor 308 of FIG. 3 is shown separate from the PEM 126. However, the DC-bus capacitor 308 may be integrated as part of the PEM 126.

As shown in FIG. 3, a storage medium 312 (hereinafter "memory"), such as computer-readable memory may store the computer program or algorithm embedded or encoded with the method. In addition, the memory 312 may store data or information about the various operating conditions or components in the PEM 126. For example, the memory 312 may store data or information about current flow through the respective phase legs 316, 318, 320. The memory 312 can be part of the controller 310 as shown in FIG. 3. However, the memory 312 may be positioned in any suitable location accessible by the controller 310.

As illustrated in FIG. 3, the controller 310 transmits at least one control signal 236 to the power converter system 126. The power converter system 126 receives the control signal 322 to control the switching configuration of the inverter and therefore the current flow through the respective phase legs 316, 318, and 320. The switching configuration is a set of switching states of the power switches 302 in the inverter. In general, the switching configuration of the inverter determines how the inverter converts power between the DC power link 306 and the electric machine 114.

To control the switching configuration of the inverter, the inverter changes the switching state of each power switch 302 in the inverter to either an ON state or an OFF state based on the control signal 322. In the illustrated embodiment, to switch the power switch 302 to either ON or OFF states, the controller/LD 310 provides the gate voltage (Vg) to each power switch 302 and therefore drives the switching state of each power switch 302. Gate voltages $Vg_{a1}$, $Vg_{a2}$, $Vg_{b1}$, $Vg_{b2}$, $Vg_{c1}$, and $Vg_{c2}$ (shown in FIG. 3) control the switching state and characteristics of the respective power switches 302. While the inverter is shown as a voltage-driven device in FIG. 3, the inverter may be a current-driven device or controlled by other strategies that switch the power switch 302 between ON and OFF states. The controller 310 may change the gate drive for each IGBT based on the rotational speed of the electric machine 114, the mirror current, or a temperature of the IGBT switch. The change in gate drive may be selected from a plurality of gate drive currents in which the change gate drive current is proportional to a change in IGBT switching speed.

As also shown in FIG. 3, each phase leg 316, 318, and 320 includes two switches 302. However, only one switch in each of the legs 316, 318, 320 can be in the ON state without shorting the DC power link 306. Thus, in each phase leg, the switching state of the lower switch is typically opposite the switching state of the corresponding upper switch. The top switches are typically referred to as high-side switches (i.e., 302A, 302B, 302C) and the lower switches are typically referred to as low-side switches (i.e., 302D, 302E, 302F). Consequently, a HIGH state of a phase leg refers to the upper switch in the leg in the ON state with the lower switch in the OFF state. Likewise, a LOW state of the phase leg refers to the upper switch in the leg in the OFF state with the lower switch in the ON state. As a result, IGBTs with current mirror capability may be on all IGBTs, a subset of IGBTs (e.g., $S_{a1}$, $S_{b1}$, $S_{c1}$) or a single IGBT.

Two situations can occur during an active state of the three-phase converter example illustrated in FIG. 2: (1) two phase legs are in the HIGH state while the third phase leg is in the LOW state, or (2) one phase leg is in the HIGH state while the other two phase legs are in the LOW state. Thus, one phase leg in the three-phase converter, which may be defined as the "reference" phase for a specific active state of the inverter, is in a state opposite to the other two phase legs, or "non-reference" phases, that have the same state. Consequently, the non-reference phases are either both in the HIGH state or both in the LOW state during an active state of the inverter.

Solid state devices (SSD), such as Insulated Gate Bipolar junction Transistors (IGBTs), Metal Oxide Semiconductor Field Effect Transistors (MOSFETs), or Bipolar Junction Transistors (BJTs) are widely used in a variety of automotive and industrial applications, such as electric motor drives, power inverters, DC-DC converters, and power modules. Operation of an IGBT and a MOSFET is voltage controlled, in which the operation is based on a voltage applied to a gate of the IGBT or MOSFET, while operation of a BJT is current controlled, in which the operation is based on a current applied to a base of the BJT. Here, the use of SSDs or high-power relays may be used to control, alter, or modulate a current between a battery and an electric machine of a vehicle.

Figure 4:
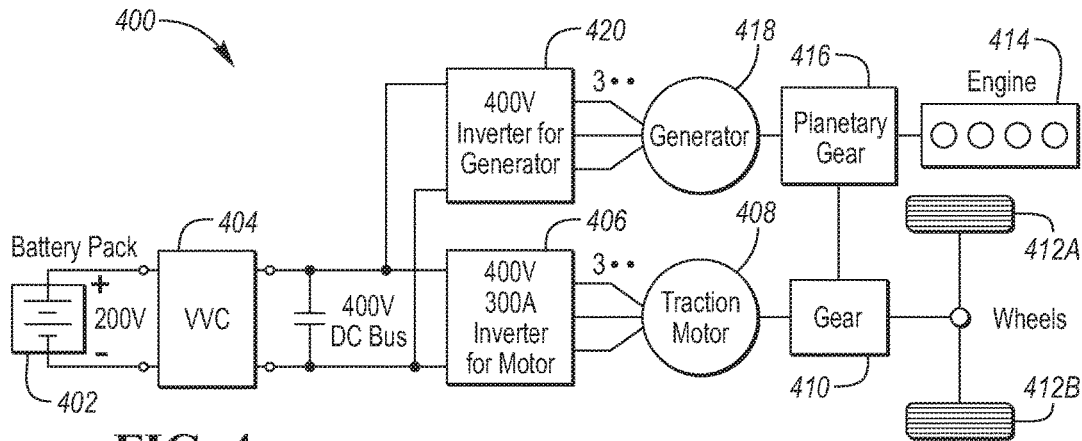
FIG. 4 is a diagram of a typical hybrid vehicle powertrain including a traction battery and DC-DC converter coupled with a motor via a power inverter.

FIG. 4 is a diagram of a typical hybrid vehicle powertrain 400 including a traction battery 402 and DC-DC converter 404 coupled with a motor 408 via a motor inverter 406. The traction motor 408 is only powered by the single motor inverter 406. The traction motor 408 is coupled with gears 410 and shafts that are configured to provide propulsive force to drive wheels 412A, 412B. Propulsive force is also generated by an internal combustion engine 414 that is coupled with planetary gears 416 and a generator 418. The generator 418 may be used to convert rotational energy into electrical energy typically AC power. The AC power is converted to DC power by a generator inverter 420 that is coupled in parallel with the motor inverter 406. In this system, the inverter power is 120 kW at 400V/300A. The power path includes two losses in series, a first loss of the DC-DC converter (e.g., VVC) 404 and a second loss of the motor inverter 406.

Figure 5:
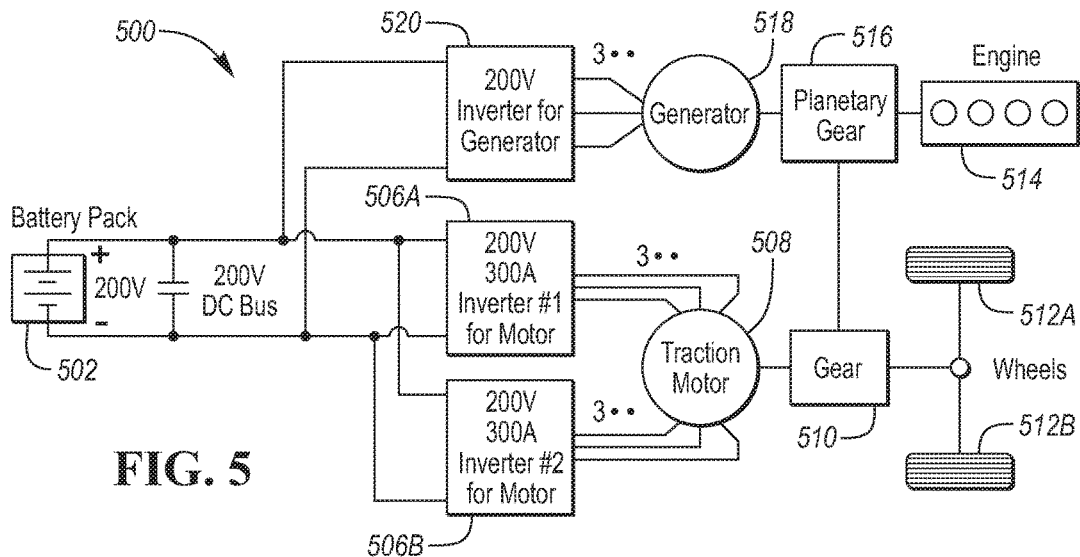
FIG. 5 is a diagram of a hybrid vehicle powertrain including a traction battery coupled with a 6-lead motor via dual power inverters.

FIG. 5 is a diagram of a hybrid vehicle powertrain 500 including a traction battery 502 coupled with a 6-lead motor 508 via dual power inverters 506A, 506B. Here the motor inverters 506A, 506B are used to independently drive a single traction motor 508. The traction motor 508 is coupled with gears 510 and shafts that are configured to provide propulsive force to drive wheels 512A, 512B. Propulsive force is also generated by an internal combustion engine 514 that is coupled with planetary gears 516 and a generator 518. The generator 518 may be used to convert rotational energy into electrical energy typically AC power. The AC power is converted to DC power by a generator inverter 520 that is coupled in parallel with the motor inverter 506A, 506B. This system may be rated at 120 kW or (200V/300A)+(200V/300A), being the sum of power of each motor inverter 506A, 506B. However, as there is no DC-DC converter, there is no DC-DC converter power loss. Further, the power loss of the motor inverter 406 from FIG. 4 is substantially equal to the power loss of the motor inverters 506A, 506B, and in some configurations less due to the lower current flowing through the inverters.

Figure 6:
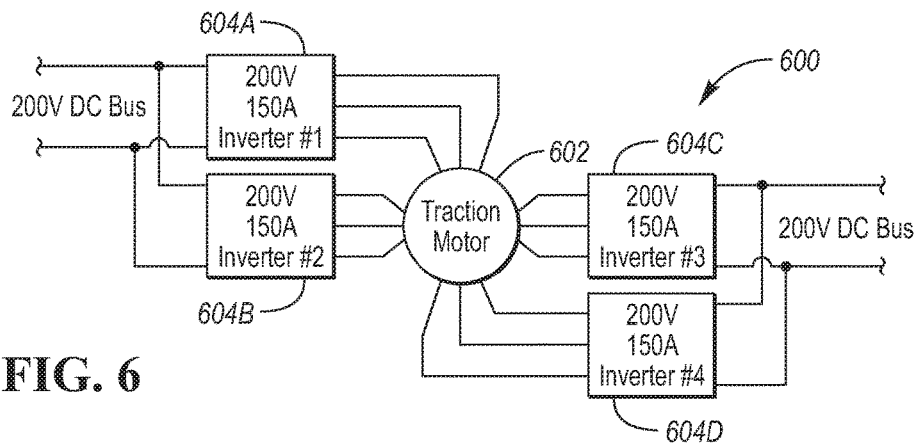
FIG. 6 is a diagram of a hybrid vehicle traction motor coupled with four power inverters.

FIG. 6 is a diagram of a hybrid vehicle system 600 having a traction motor 602 coupled with four power inverters 604A, 604B, 604C, 604D. Here the available power to drive the electric machine may be increased by increasing a number of inverters used to drive the traction motor. In this system the total power is 120 kW or (200V/150A)+(200V/150A)+(200V/150A)+(200V/150A), being the sum of power of each motor inverter 604A, 604B, 604C, 604D, however, if motor inverters similar to the motor inverters 506A, 506B were used, the total power would be 240 kW or 4*(200V/300A).

FIG. 7 is a diagram of a typical electric motor connection 700 for a 3-lead power inverter. Here end winding connections are shown for stator windings in which the stator has 24 teeth. However, the same principle may be applied to other stator configurations such as a stator with teeth ranging from 6 to 48-teeth such as a stator having 12, 18, 24, 30, 48 or other multiple of 6 number of teeth. This winding configuration is for a 3-phase motor having a single connection of the three leads Lead A 702, Lead C 704, and Lead B 706 wired in a 'Y' configuration having a neutral node 708. For example, here a current passed through the A1 winding to the A2 winding to the A3 winding to the A4 winding to the neutral terminal 708. After which the current may return via either the B or C windings.

FIG. 8 is a diagram of an electric motor connection 800 for dual 3-lead power inverters. Here end winding connections are shown for stator windings in which the stator has 24 teeth. However, the same principle may be applied to other stator configurations such as a stator with teeth ranging from 6 to 48 teeth such as a stator having 12, 18, 24, 30, 48 or other multiple of 6 number of teeth. This winding configuration is for a 3-phase motor having dual 3-lead connections (Lead A' 802, Lead C' 804, and Lead B' 806) and (Lead A" 802, Lead C" 804, and Lead B" 806) both of which are wired in a 'Y' configuration having a neutral node 808A and 808B. For example, here a current passed through the A1 winding to the A2 winding to the neutral terminal 808A while a second independent current passes through the A3 winding to the A4 winding to the neutral terminal 808B. Afterwhich the currents may return via either the B'/B" or C'/C" windings respectively. An advantage to this winding configuration is that a standard stator configuration may be used to implement this configuration.

FIG. 9 is a diagram of an electric motor connection 900 for four 3-lead power inverters. Here end winding connections are shown for stator windings in which the stator has 24 teeth. However, the same principle may be applied to other stator configurations such as a stator with teeth ranging from 6 to 48 teeth such as a stator having 12, 18, 24, 30, 48 or other multiple of 6 number of teeth. This winding configuration is for a 3-phase motor having quad 3-lead connections (Lead A' 902, Lead C' 904, and Lead B' 906), (Lead A" 902, Lead C" 904, and Lead B" 906), (Lead A'" 902, Lead C'" 904, and Lead B'" 906), and (Lead A"" 902, Lead C"" 904, and Lead B"" 906) of four of which are wired in a 'Y' configuration having a neutral node 908A 908B, 908C, and 908D. For example, here a current passed through the A1 winding to the neutral terminal 908A while a second independent current passes through the A2 winding to the neutral terminal 908B. A third independent a current passed through the A3 winding to the neutral terminal 908C while a fourth independent current passes through the A4 winding to the neutral terminal 908D. After which the currents may return via either the B or C windings respectively. This configuration shares the advantage of being a standard stator configuration.

Figure 10:
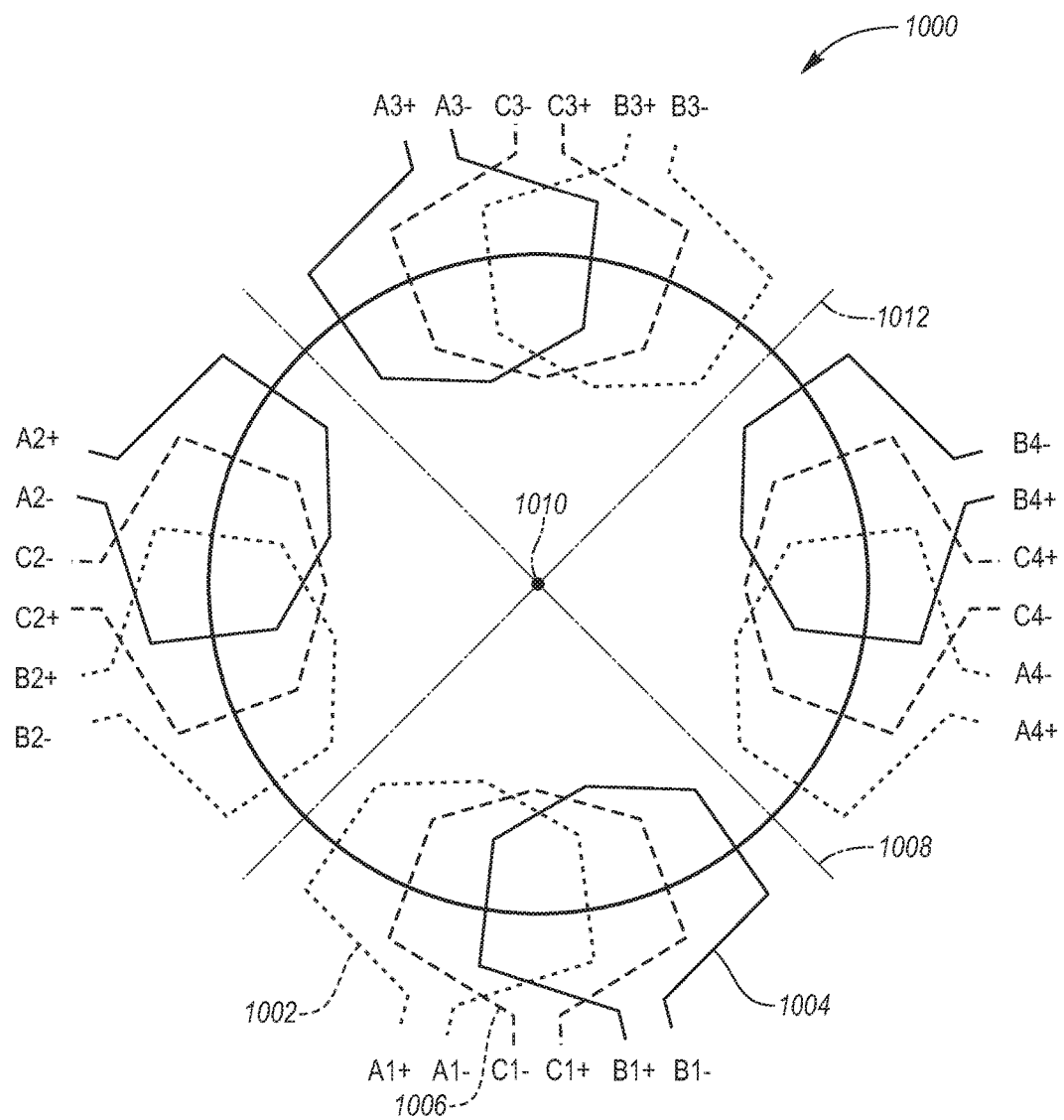
FIG. 10 is a cross sectional diagram of a configuration of stator windings.

FIG. 10 is a cross sectional schematic diagram of winding connections 1000 for a stator of an electric machine. Here, 12 windings are shown associated with a 24 tooth stator. In each section of the stator are the 3-phase leads A 1002, B 1004, and C 1006. In one embodiment, each lead in this diagram is associated with 1 stator tooth when the stator has 24 teeth, however if this was a 48-tooth stator, each lead would be associated with two stator teeth. However in other embodiments, each lead in this diagram may be associated with more than one stator tooth, such as 3 stator teeth or 6 stator teeth. Also, each winding shown here with two leads (e.g., A1+ and A1−) may occupy any number of slots. So, each winding can occupy 2, 4, 6, 8, etc. slots. A slot is the open area between two stator teeth wherein copper windings may be placed inside the slots. In which the number of slots is equal to the number of teeth. Further, the stator may be divided in half along a first plane 1008 (e.g., a reference plane) that intersects with a rotational axis 1010 of the electric machine. The stator may be further divided into quarters by a second plane 1012 that also intersects with the rotational axis 1010.

Figure 11:
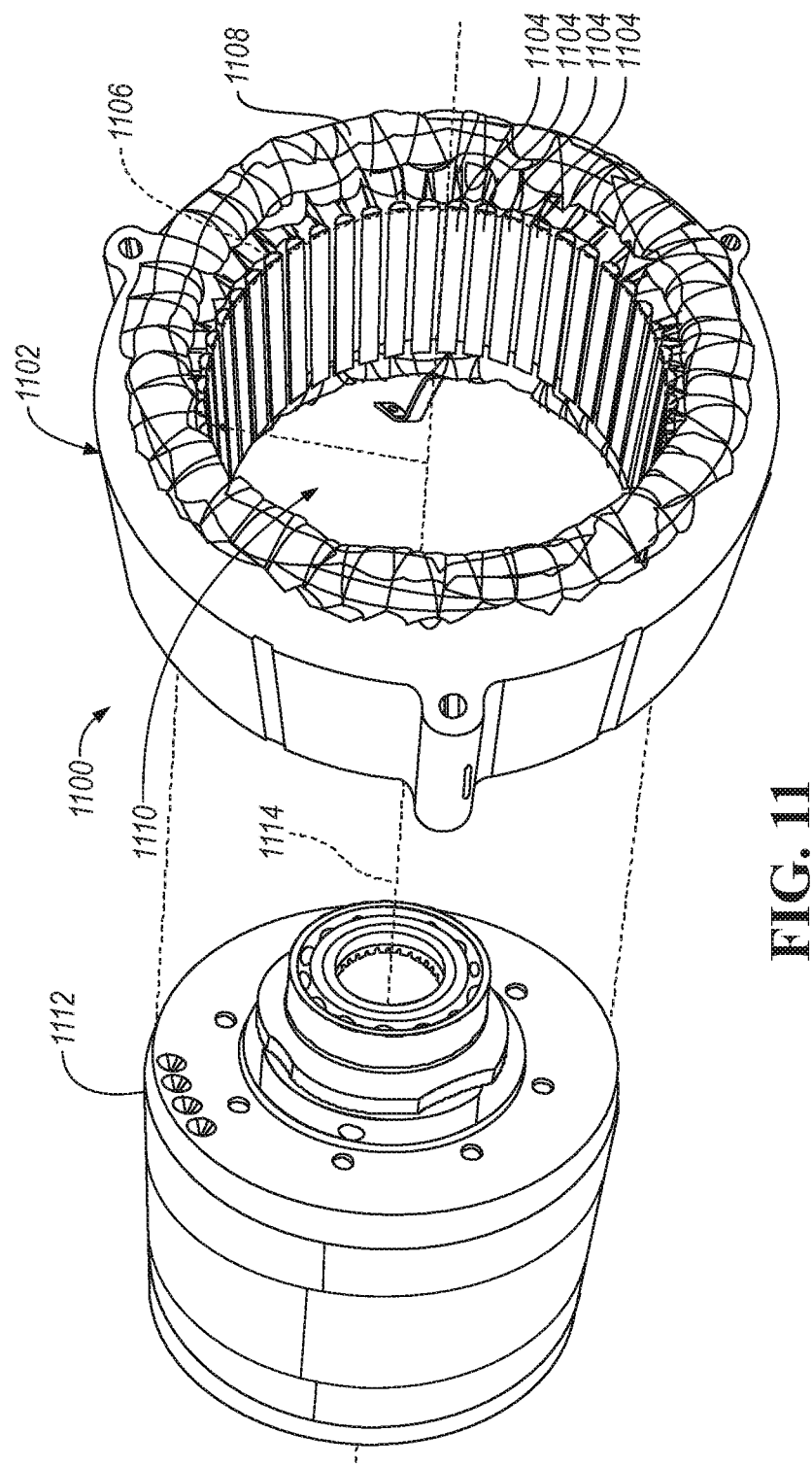
FIG. 11 is an exploded view of an electric machine illustrating stator teeth and a rotor.
Figure 12:
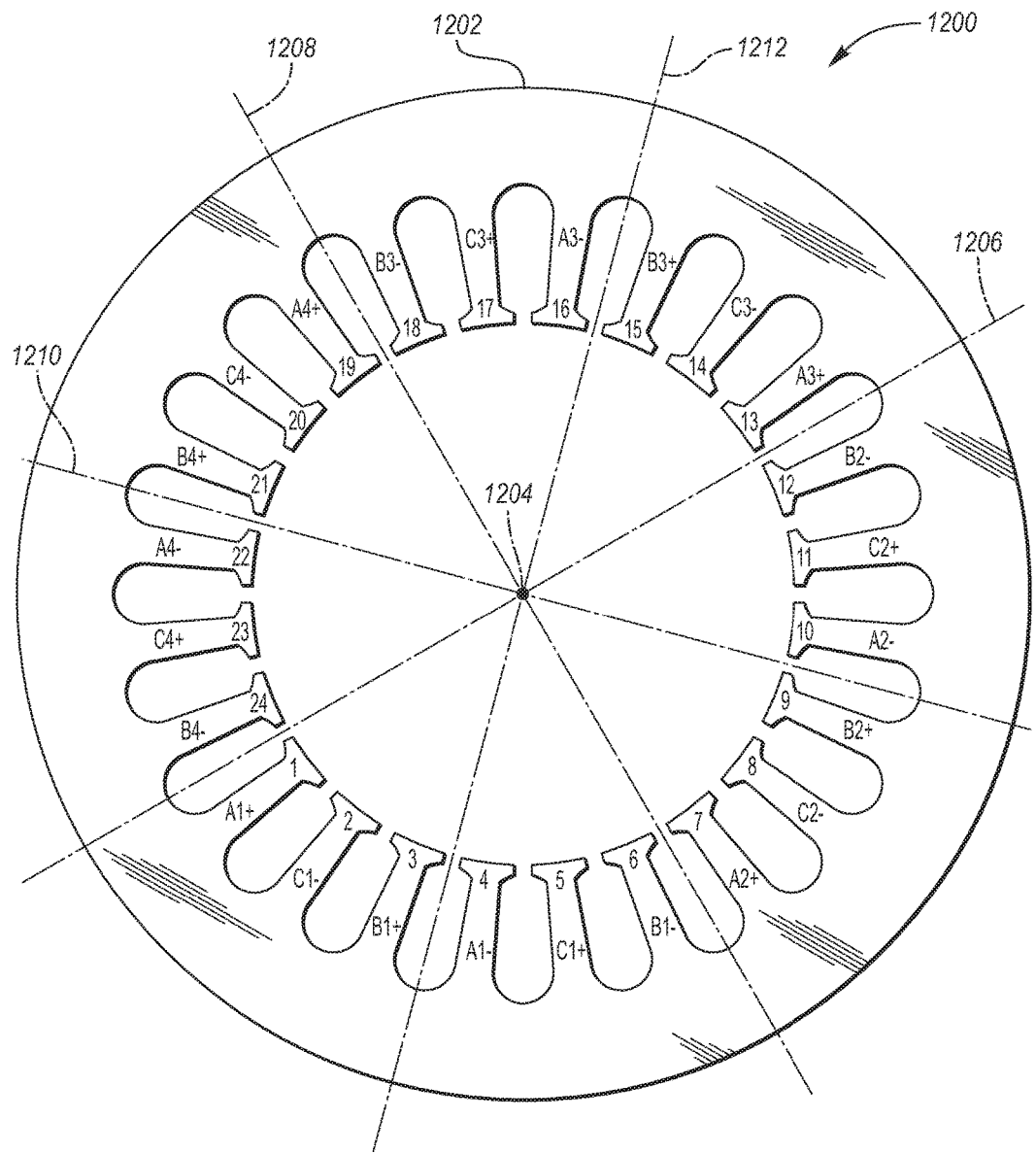
FIG. 12 is a cross sectional view of a stator core for an electric machine.

FIG. 11 is an exploded perspective view of an electric machine 1100 having a stator 1102 that defines a plurality of stator teeth 1104 along an inner diameter 1106 that defines a cavity 1110 configured to permit a rotor 1112 to spin freely about a rotational axis 1114. Each of stator teeth 1104 has a winding around it to induce a field channeled by the tooth upon which the winding is wound. In this example, the stator has 48 stator teeth. Also, the stator 1102 includes end windings 1108 which carry a current in windings that travel in the slots in between the stator teeth 1104 to induce a field in the stator teeth 1104. In this application a current flowing in the end windings 1108 between a connection point and a slot is assumed to be insufficient to induce a field in a stator tooth, while the current when flowing in a winding located in a slot is sufficient to induce a field in a stator tooth FIG. 12 is a cross sectional view of a stator core 1200 for an electric machine. Here, a 24 tooth stator is shown. The stator is symmetrical around a rotational axis 1204 upon which a rotor may be configured to spin. The stator is divided into section by a first plane 1206 and a second plane 1208 that intersect along the rotational axis 1204. In this embodiment, the stator teeth are labeled to match the wiring of FIGS. 7, 8, and 9 (e.g., A1+, A1−). However, this stator may be used to illustrate multiple configurations. For example, in a dual inverter system, the stator teeth may be divided by a plane 1206 such that one inverter drives windings of half of the stator teeth (1-12) and the other inverter drives windings of the other half of stator teeth (13-24). Also in a two inverter system, the stator teeth may be divided by two planes 1206 and 1208 such that one inverter drives windings of a first and third quarter of the stator teeth (1-6, 13-18), and a second inverter drives windings of a second and fourth quarter of the stator teeth (7-12, 19-24). In yet another embodiment, a two inverter system may have the stator teeth divided by four planes 1206, 1208, 1210, and 1212 such that the first inverter drives windings of a first eighths, third eighths, fifth eighths, and seven eighths of the stator teeth (1-3, 7-9, 13-15, 19-21) and the second inverter drives windings of a second eighths, fourth eighths, sixth eighths, and eight eighths of the stator teeth (4-6, 10-12, 16-18, 22-24).

In another embodiment, each winding enters in the slot clockwise to the positive label and exits in the slot clockwise to the negative label thus inducing a field in three stator teeth therebetween. For example, a winding as described in FIG. 10 consisting of A1+ and A1− would induce a field in the teeth numbered 1, 2, and 3. While the winding consisting of B1+ and B1− would induce a field in the teeth numbered 3, 4, and 5, and the winding consisting of C1+ and C1− would induce a field in the teeth numbered 2, 3, and 4. Further, each lead can occupy any number of slots thus, each winding can occupy 2, 4, 6, 8, etc. slots.

Another example is a four inverter system, in which the stator teeth may be divided by two planes 1206 and 1208 such that one inverter drives windings of a quarter of the stator teeth (1-6), a second inverter drives windings of a second quarter of the stator teeth (7-12), a third inverter drives windings of a third quarter of the stator teeth (13-18), and a fourth inverter drives windings of a fourth quarter of the stator teeth (19-24). In yet another embodiment, a four inverter system may have the stator teeth divided by four planes 1206, 1208, 1210, and 1212 such that the first inverter drives any two sets of windings of the eight, the second inverter drives two unique windings of the eight, the third inverter drives two other unique windings of the eight, and the fourth inverter drives the last remaining two unique windings of the eight.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle powertrain comprising:
   an electric machine including a stator defining teeth separated by slots configured to accept windings; and
   four inverters each configured to exclusively drive current in some but not all of the windings such that the inverters respectively induce a field in some of the teeth located in a different one of four distinct sectors of the stator.

2. The powertrain of claim 1 further comprising a traction battery coupled with the inverters such that the inverters operate at a terminal voltage of the traction battery.

3. A vehicle powertrain comprising:
   an electric machine having a stator that includes windings; and
   four inverters each configured to exclusively drive current in some but not all of the windings such that each of the inverters induces a field in teeth of the stator located in one of four distinct sectors of the stator.

4. The powertrain of claim 3 further comprising a traction battery coupled with the inverters such that the inverters operate at a terminal voltage of the traction battery.

5. The powertrain of claim 4 further comprising a generator and a generator inverter such that the generator provides power to the battery at the terminal voltage.

6. The powertrain of claim 3, wherein the stator is a laminate core stator.

7. A method for a stator having sectors comprising:
   a first inverter inducing a first field in stator teeth of a first of the sectors;
   a second inverter inducing a second field in stator teeth of a second of the sectors;
   a third inverter inducing a third field in stator teeth of a third of the sectors; and
   a fourth inverter inducing a fourth field in stator teeth of a fourth of the sectors.

8. The method of claim 7, wherein the stator is divided into the sectors by two planes that are 90 degrees apart, and are coincident with a central axis.

* * * * *